United States Patent [19]

Bendiner et al.

[11] 4,229,493
[45] Oct. 21, 1980

[54] BALED WASTEPAPER PRODUCT CONTAINING A DEINKING CHEMICAL

[75] Inventors: Bernard Bendiner, Richland Township, Kalamazoo County, Mich.; Barry I. Margolis, Highland Park, Ill.

[73] Assignee: Fibre-Chem Corporation, Highland Park, Ill.

[21] Appl. No.: 34,685

[22] Filed: Apr. 30, 1979

[51] Int. Cl.$^3$ .............................................. B65D 71/00
[52] U.S. Cl. ............................................ 428/2; 162/5; 162/100

[58] Field of Search ................... 162/4, 5, 6, 7, 8, 100; 428/2; 206/83.5

[56] References Cited

U.S. PATENT DOCUMENTS

| 2,822,236 | 2/1958 | Sheldon et al. | 162/78 |
| 3,056,713 | 10/1962 | Gartner | 162/5 |
| 3,822,178 | 7/1974 | Von Koeppen et al. | 162/5 |
| 4,148,952 | 4/1979 | Nelson et al. | 428/2 |

*Primary Examiner*—William F. Smith
*Attorney, Agent, or Firm*—Blanchard, Flynn, Thiel, Boutell & Tanis

[57] ABSTRACT

A bale of wastepaper containing deinking chemical.

11 Claims, No Drawings

BALED WASTEPAPER PRODUCT CONTAINING A DEINKING CHEMICAL

This invention relates to a bale of wastepaper which has been treated so as to contain deinking chemical.

It is well-known to deink and defiber wastepaper by pulping the wastepaper in suitable chemical solutions whereby to obtain paper-making fibers and to loosen the ink from the fibers. The chemicals used comprise alkalies such as caustic soda, soda ash and sodium phosphate, together with synthetic organic surface active agents.

The handling of deinking chemicals, particularly the synthetic organic surface active agents, in the paper mill involves difficulties, including the need to store a variety of different deinking chemicals and the need to measure and adjust the concentration of the chemicals during the deinking process. Because of variations in wastepapers from various sources, the deinking process can become quite complex and careful monitoring of the operation is needed in order to obtain good results. The operation of paper mills using wastepaper as a cellulose fiber source can be considerably improved by minimizing the number of operations which are required to be performed at the mill site. However, it has been considered heretofore that there is no alternative to the conventional techniques wherein all of the deinking chemicals are added during the pulping and deinking process in the mill. At present, the function of the wastepaper source is largely one of collecting wastepaper, baling it and shipping the bales to the paper mill. In many cases, the wastepaper source will perform a preliminary sorting to eliminate objectionable papers. Paper mills will pay a premium price for wastepaper which has been carefully sorted because this will eliminate the need for further sorting at the mill.

We have discovered that bales of wastepaper can be treated so as to contain the synthetic organic surface active agent deinking chemicals which are effective to disperse ink, in the pulper, in the form of very small ink particles having a size of about 1 micron or less. The thus-treated bales of wastepaper can be shipped to the paper mill for deinking and preparation of paper products therefrom. In the deinking operation, it is necessary for the mill personnel to add only the alkali and, therefore, the deinking operation at the paper mill is considerably simplified.

Our invention possesses the additional advantage that it provides a new product for export. The practice of deinking wastepaper through dispersion of ink particles is far less widespread in foreign countries than it is in the United States because there is a considerably lesser amount of deinking grades of wastepaper generated in those countries. Thus, in foreign countries, higher quality paper products are commonly made from virgin pulp. Many foreign paper mills do not have extensive experience in and knowledge about deinking wastepaper through dispersion of ink particles in the pulper and they do not use large amounts of deinking grades of wastepaper as a fiber source, even though it is ecologically and economically advantageous to do so. The main problem has been a lack of a consistent supply of deinking grades of wastepaper. It is considered that the product of this invention will be highly advantageous for export to such countries because it will permit foreign paper mills to use wastepaper because the deinking operation through dispersion of ink particles will be easy to carry out.

The invention makes it possible for a supplier of wastepaper, such as a wastepaper dealer, a wastepaper grader, or a paper converting plant that generates wastepaper to supply bales of high-quality wastepaper, pretreated with the synthetic organic surface active agent so that the deinking operation, through dispersion of ink particles, can be performed in a simpler fashion at the paper mill. Because of centralized processing by the wastepaper supplier, a substantial reduction of deinking cost is achieved. The invention is particularly useful for supplying high-quality wastepaper which can be used to prepare high-quality paper products. The wastepaper supplier can provide to paper mills, both domestic and foreign, bales of wastepaper containing the proper amount of deinking chemical for achieving effective deinking, through dispersion of ink particles, of the particular type of wastepaper contained in the bale, i.e. a so-called "tailor-made" wastepaper bale which can be effectively defibered and deinked by conventional techniques and wherein the mill personnel need add only the alkali required for proper pH adjustment.

According to the invention, there is provided a bale of wastepaper containing incorporated therein or thereon an effective amount of water-soluble or water-dispersible deinking chemical effective for dispersing ink, in the pulper, in the form of very small ink particles having a particle size of about 1 micron or less. The chemical is preferably a nonionic synthetic organic surface active agent. In a preferred embodiment of the invention, the surface active agent is admixed with a water-soluble or water-dispersible adhesive and a water solution or dispersion of that mixture is applied to all or a portion of the surface of the bale so as to be impregnated and/or coated thereon. Alternatively, the deinking chemical and the adhesive can be applied separately to the bale, i.e. the deinking chemical can be applied to the bale either in powder form or in aqueous solution form and then the aqueous adhesive sprayed thereon, or the aqueous adhesive can be sprayed on the bale and before it dries, the deinking chemical can be sprayed thereon.

The wastepaper that is used in this invention is preferably comprised of shredded paper made from chemical pulp and/or bleached ground wood pulp. For example, there can be used printed books, magazines, newspapers, catalogs, tabulating cards, ledger, bond and writing papers, paper cups, paper milk cartons, etc. Most of the wastepaper will have printing on it, but the presence of wastepaper free of printing is not objectionable. The bales of wastepaper will be of any convenient size. It is customary to bale wastepapers in compressed bales weighing from 500 to 2000 pounds, but this weight is not critical. As is customary, the bales will be bound by wires, bands or the like so as to form a compressed, shape-retaining bundle of a multiplicity of paper objects.

Usually, the wastepaper is sorted by the wastepaper supplier according to wastepaper grades as specified by wastepaper customers. The paper mill will order from the wastepaper supplier the grade of wastepaper desired for treatment and that will give the quality of deinked stock desired, because the wastepaper will normally be deinked for the purpose of preparing a specific paper product.

It is preferred that the bale of wastepaper is treated with an aqueous solution or dispersion containing a water-soluble or water-dispersible adhesive and synthetic organic surface active agent. The aqueous solution or dispersion will be absorbed in the surface layer of the bale and/or it will form a thin coating film on the surface of the wastepaper bale, depending on the absorption characteristics of the wastepaper and the characteristics of the aqueous solution or dispersion. Thus, when the adhesive possesses a strong film-forming characteristic, more of the adhesive and the surface active agent will be present as a film on the surface of the bale, whereas when the adhesive does not have a strong film-forming characteristic, the solution or dispersion will be impregnated into the paper on the surface of the bale. In most cases, however, the treating material will be present partly in the form of an external coating film and partly impregnated into the surface layer of the wastepaper bale.

The mode of applying the aqueous solution or dispersion to the bale is not critical. There can be used, for example, the procedures of spraying the solution or dispersion with a spray gun, immersion of the bale in a bath of the solution or dispersion, roller coating, knife coating, etc. Application of the coating of the aqueous solution or dispersion by spraying with a spray gun is advantageous and is preferred.

The adhesive used in the treating composition is a water-based adhesive, i.e., an adhesive that can be dissolved or dispersed in water alone. Most of the adhesive will be removed with the waste water during the subsequent deinking and paper-making process, i.e., the adhesive will not be present in the final paper product in substantial amounts. As the adhesive, there can be used conventional water-based adhesives including casein, dextrin, starch, alginates, animal glue, water-soluble gums, polyvinyl alcohol, cellulose ethers, hydroxyethyl cellulose, methyl cellulose, hydroxypropyl methyl cellulose, sodium carboxymethyl cellulose, polyacrylic acid salts, carboxyvinyl polymer (Carbopole), polyethylene oxide, polyvinyl methyl ether, polyvinyl pyrrolidone, and sodium silicate. The adhesive will be selected, taking into consideration the synthetic organic surfactant with which it is to be employed, so that it will not degrade the properties of the surfactant during storage. Thus, an adhesive substantially inert to the surfactant will be used. In the event that the final paper product is to be used for packaging foods and some adhesive remains in the final paper product, it will be necessary to use an adhesive that is approved by government authorities, such as the United States Food and Drug Administration, for use in packaging for foods.

The synthetic water-soluble or water-dispersible organic surfactant can be selected from anionic, cationic, nonionic and amphoteric surfactants useful for deinking wastepaper. Mixtures of these surfactants can be used, except that mixtures of anionic and cationic surfactants are not used because of their mutual incompatibility. It is preferred to use nonionic surfactants, particularly polyoxyethylene alcohols and alkylphenols, prepared by adducting from 1 to 50 moles of ethylene oxide, preferably from 5 to 20 moles of ethylene oxide, to an aliphatic alcohol having from 8 to about 20 carbon atoms, preferably from 12 to 18 carbon atoms or an alkylphenol having 8 to 12 carbon atoms in the alkyl group. It is especially preferred to use adducts of 5 to 15 moles of ethylene oxide to an alkylphenol having about 9 carbon atoms in the alkyl group, which is commercially available under the designation Igepal CO series. It is preferred to use such nonionic surfactants because they emulsify the ink and make it unnecessary to remove ink residue from the fibers prior to making paper therefrom because the ink residues are of such small size, usually about 1 micron or less, that they are not visible to the naked eye. Anionic, cationic or amphoteric surfactants can be used, in minor amounts, in combination with the preferred nonionic surfactants.

The amount of the synthetic organic surface active agent applied to the wastepaper bale will be selected so that effective deinking of the wastepaper can be obtained. The amount of surfactant used will depend on the amount of ink present on the wastepaper and experimentation will be necessary to determine the optimum amount for any particular wastepaper. It is an advantage of the invention that the wastepaper supplier can determine this and experimentation at the mill will not be necessary. Further, a wastepaper supplier having a stable source of wastepaper of substantially uniform properties can supply to paper mills highly uniform bales of wastepaper pretreated with the proper amount of deinking chemical. In general, the amount of surfactant used will be from 0.01 to 10% by weight, based on the weight of the wastepaper. The preferred amount of the nonionic described above is from about 0.1 to about 5% by weight, most especially 0.5 to 3% by weight, based on the weight of the wastepaper.

The amount of adhesive used will be an amount effective to maintain the synthetic organic surface active agent adhered to the paper bale. The use of an excess amount of the adhesive will not be technologically harmful, but it will be uneconomical. In general, the preferred amount of the adhesive is in the range of from about 5% to about 500%, based on the amount of the synthetic organic surface active agent.

The amount of water in the treating solution is not critical, except that it must be sufficient to dissolve or disperse the adhesive and surface active agent. The use of excess water should be avoided to minimize wetting of the bale. In general, the treating solution can contain from about 50% to about 99% by weight of water.

The treating solution can optionally contain effective amounts of other adjunct substances useful in the deinking procedure, such as dewaxing chemicals, slimicides, biocides and defoamers. These are well-known substances and any of those conventionally used can also be employed in the present invention.

The actual deinking and defibering of the wastepaper will take place at the paper mill. For this purpose, there can be used the conventional equipment and processing techniques known in the art for deinking and defibering wastepaper. Description of these conventional procedures is unnecessary because they are well known.

EXAMPLE

A bale of wastepaper weighing 500 pounds and comprising a mixture of book paper and ledger stock is sprayed with 25 pounds of a treating composition comprising 10 wt. % of Igepal CO-530 (available from GAF), 20 wt. % of polyvinyl alcohol (molecular weight: 120,000 to 150,000) and the balance water. Igepal CO-530 is an adduct of about 6 moles of ethylene oxide to nonylphenol. Although no special drying step is performed, during storage the wastepaper bale becomes dried on the surface and the Igepal CO-530 and polyvinyl alcohol are present as a surface film thereon. At the paper mill, the bale wires are cut and the wastepaper pieces fall into a pulper and are mixed together with water and are vigorously agitated so as to be transformed to a defibered pulp slurry of approximately 5% consistency. Sodium hydroxide is added to the pulp to maintain the pH of the pulp at about 10.0 during pulping. The temperature of the pulp is normally maintained in the range of from 150° F. up to 200° F. during pulping. The wastepaper is defibered and the ink is broken down to about 1 micron size particles that remain primarily with the fiber. The aqueous ink- and fiber-containing slurry is employed to form a sheet using a cylinder machine. The sheet is then coated with a starch-clay coating. There is obtained a white sheet of excellent quality useful as a top liner for paperboard.

The foregoing description has referred to the preferred procedure wherein both the deinking chemical and an adhesive are applied to the wastepaper bale. In a less preferred modification of the invention, the adhesive can be omitted and, instead, the deinking chemical and, optionally, the adjunct substances, can be incorporated into the interior of the bale. For example, an aqueous solution or dispersion of the deinking chemical can be sprayed on interior sheets of the bale so as to be absorbed thereby. Further, the deinking chemical can be placed in a hole bored in the bale or it can be placed between layers of the paper in the bale. It will be convenient to package the deinking chemical in water-soluble packaging material, for these latter purposes.

Although a particular preferred embodiment of the invention has been disclosed in detail for illustrative purposes, it will be recognized that variations or modifications of the disclosed method lie within the scope of the present invention.

The embodiments of the invention in which an exclusive property or privilege is claimed are defined as follows:

1. A bale of wastepaper containing incorporated therein an effective amount of water-soluble or water-dispersible deinking chemical for deinking said wastepaper, said deinking chemical consisting essentially of synthetic organic surface active agent effective to disperse ink present on the wastepaper in the form of very small ink particles when the bale of wastepaper is deinked and pulped in an aqueous alkaline bath.

2. A bale of wastepaper according to claim 1 wherein said deinking chemical is mixed with a water-soluble or water-dispersible adhesive.

3. A bale of wastepaper according to claim 1 wherein the deinking chemical is adhered to, impregnated in or deposited in said bale.

4. A bale of wastepaper according to claim 2 which has been prepared by applying a water solution or water dispersion of said deinking chemical and said adhesive to the external surface of said bale.

5. A bale of wastepaper according to claim 1 or claim 4 wherein said bale contains from 0.01 to 10% by weight of said synthetic organic surface active agent, based on the weight of said wastepaper.

6. A bale of wastepaper according to claim 1 or claim 4 wherein said bale contains from about 0.5 to about 3% by weight of said synthetic organic surface active agent, based on the weight of said wastepaper.

7. A bale of wastepaper according to claim 1 or claim 4 wherein said synthetic organic surface active agent consists essentially of nonionic polyoxyethylene alcohol or alkylphenol surface active agent containing 1 to 50 moles of ethylene oxide adducted to an aliphatic alkanol having 8 to 20 carbon atoms or to an alkylphenol having 8 to 12 carbon atoms in the alkyl group.

8. A bale of wastepaper according to claim 1 or claim 4 wherein said synthetic organic surface active agent consists essentially of nonionic polyoxyethylene alcohol or alkylphenol surface active agent containing 5 to 20 moles of ethylene oxide adducted to an aliphatic alkanol having 12 to 18 carbon atoms or an alkylphenol having 8 to 12 carbon atoms.

9. A bale of wastepaper according to claim 1 or claim 4 wherein said synthetic organic surface active agent consists essentially of nonionic polyoxyethylene alkylphenol surface active agent containing 5 to 15 moles of ethylene oxide adducted to nonylphenol.

10. A bale of wastepaper according to claim 1 also containing incorporated therein slimicide, biocide, defoamer, dewaxing agent or mixture thereof.

11. A bale of wastepaper according to claim 4 made up of shredded paper from books, magazines, newspapers, catalogs, tabulating cards, ledger paper, bond paper, writing paper, paper cups, paper milk cartons and like wastepaper products, said bale weighing from 500 to 2,000 pounds and being bound by wires or bands, and in which at least part of the mixture of said deinking chemical and said adhesive is present in the form of an external coating film on the surface layer of said wastepaper bale.

* * * * *